(12) United States Patent
Lin et al.

(10) Patent No.: US 9,830,526 B1
(45) Date of Patent: Nov. 28, 2017

(54) GENERATING IMAGE FEATURES BASED ON ROBUST FEATURE-LEARNING

(71) Applicant: Adobe Systems Incorporated, San Jose, CA (US)

(72) Inventors: Zhe Lin, Fremont, CA (US); Xiaohui Shen, San Jose, CA (US); Jonathan Brandt, Santa Cruz, CA (US); Jianming Zhang, Boston, MA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/166,164

(22) Filed: May 26, 2016

(51) Int. Cl.
| | |
|---|---|
| *G06K 9/62* | (2006.01) |
| *G06K 9/46* | (2006.01) |
| *G06K 9/48* | (2006.01) |
| *G06N 3/08* | (2006.01) |
| *G06N 3/04* | (2006.01) |

(52) U.S. Cl.
CPC .......... *G06K 9/4628* (2013.01); *G06K 9/481* (2013.01); *G06K 9/6269* (2013.01); *G06K 9/6277* (2013.01); *G06N 3/04* (2013.01); *G06N 3/08* (2013.01)

(58) Field of Classification Search
CPC .. G06K 9/4628; G06K 9/6277; G06K 9/6269; G06K 9/481; G06N 3/04; G06N 3/08
See application file for complete search history.

(56) References Cited

U.S. PATENT DOCUMENTS

| | | | | |
|---|---|---|---|---|
| 2014/0006313 | A1* | 1/2014 | Kumar | G06Q 40/06 705/36 R |
| 2014/0280251 | A1* | 9/2014 | Somekh | G06F 17/30867 707/754 |
| 2014/0310281 | A1* | 10/2014 | Somekh | G06F 17/30312 707/737 |
| 2016/0174902 | A1* | 6/2016 | Georgescu | G06T 7/73 600/408 |

OTHER PUBLICATIONS

Ren, et al., "Faster R-CNN: Towards Real-Time Object Detection with Region Proposal Networks," Advances in Neural Information Processing Systems (2015), 14 pages.
Krizhevsky, et al., "ImageNet Classification with Deep Convolutional Neural Networks," "Imagenet classification with deep convolutional neural networks," Advances in Neural Information Processing Systems (2012), 9 pages.

* cited by examiner

*Primary Examiner* — Samir Ahmed
(74) *Attorney, Agent, or Firm* — Kilpatrick Townsend & Stockton LLP

(57) ABSTRACT

Techniques for increasing robustness of a convolutional neural network based on training that uses multiple datasets and multiple tasks are described. For example, a computer system trains the convolutional neural network across multiple datasets and multiple tasks. The convolutional neural network is configured for learning features from images and accordingly generating feature vectors. By using multiple datasets and multiple tasks, the robustness of the convolutional neural network is increased. A feature vector of an image is used to apply an image-related operation to the (Continued)

image. For example, the image is classified, indexed, or objects in the image are tagged based on the feature vector. Because the robustness is increased, the accuracy of the generating feature vectors is also increased. Hence, the overall quality of an image service is enhanced, where the image service relies on the image-related operation.

20 Claims, 10 Drawing Sheets

GENERATING IMAGE FEATURES BASED ON ROBUST FEATURE-LEARNING

TECHNICAL FIELD

This disclosure relates generally to techniques for image processing and, more specifically, to generating features from images based on robust feature-learning that spans multiple training datasets and multiple tasks. The features are usable for, for example, image classification, tagging, and indexing.

BACKGROUND

For image-related services, client-server architectures are popularly used. For example, an image service can is hosted on a server to provide a client (e.g., a mobile device) access to a collection of images maintained by the server. The client can search, download, and use images available from the server.

Generally, existing image services extract features from images, where these features support various operations related to the images, some of which are made accessible to clients. Many of the existing image services implement a feature-learning framework for learning the features. Feature-learning involves using a feature-embedding function to generate compact and representative feature vectors. A feature vector includes values representing different visual content from an image. For example, in an image of a tree, a feature vector include numerical values representing a trunk, branch, or leaf of the tree. The feature vector is subsequently used for operations such as, for example, to classify the image. Hence, the image is classified in a "tree" category.

A commonly used feature-learning framework implements a convolutional neural network. The convolutional neural network includes multiple layers for processing images and, accordingly, generating feature vectors. The accuracy of learning features depends on how well the convolutional neural network is trained. Generally, training is driven by a training dataset and a training task. The training dataset is labeled. The training task is defined by the labels and by a type of cost function (e.g., a regression loss, a classification loss, or other loss-based functions).

Current solutions for training a convolutional network for a specific task involve a single training dataset having labels specific to that training dataset. Many reasons exist for this training approach. In one example, layers of the convolutional neural network are set to learn features according to the training task. In another example, the computational burden associated with the training may require this approach. Generally, the more advanced the training (e.g., the larger the training dataset), the higher the computational burden becomes.

Once a convolutional neural network is trained, the trained network can be used to learn features from an image. The feature learning can be highly accurate if the image falls within the boundary of the training (e.g., the labels used for the training can be properly applied to the image). Otherwise, the robustness of the convolutional neural network suffers. Specifically, in many real-world scenarios, a single training dataset and training task can be insufficient for learning robust and generalizable feature representation due to, for example, label noise, imbalance of label distribution, and shift in data distribution within the training dataset. The impact to the robustness and, thus, to the accuracy of learning feature can reduce the quality of service provided to clients.

To illustrate this impact to the robustness and accuracy, consider an example of image classification based on gender. In this illustrative example, known gender images are used to train a convolutional neural network for gender classification. Thus, this network can accurately generate features for classifying people based on gender. With respect to gender-based classification, an image service that relies on the convolutional neural network to classify images can perform well. However, using the convolutional neural network with features for other classifications (e.g., for age-based classification) may provide less accurate results. The quality of service can similarly degrade for the other classifications.

SUMMARY

One exemplary embodiment involves increasing robustness of generating features representing content of images based on a multiple dataset and task training. In particular, multiple training datasets and multiple training tasks are used to train a convolutional neural network. As used herein, a "training domain" represents a training dataset and one or more associated training tasks. Generally, the convolutional neural network is trained across different training domains. For example one training domain relates to gender-based images (e.g., training images labeled for gender classification), while another training domain relates to age-based images (e.g., training images labeled for age classification).

In contrast to existing systems that use a single training domain (e.g., a single dataset training or a single task training), the multiple domain training results in more generalizable feature representations. That is because the feature representations are learned across all of the different training domains. For instance, the convolutional neural network is trained to generate feature representation applicable to gender and age, individually and in combination. Hence, training enables the convolutional neural network to learn each feature individually, in combination with another feature, and to transfer knowledge about this feature to the other feature (e.g., how gender can impact an age prediction). In addition, the training is more robust to, for example, label noise, imbalance of label distribution, and shift in data distribution. In comparison, an existing system that uses a single training domain learns feature representation specific to the single domain and is insufficient for learning robust and generalizable feature representation outside of that domain.

Hence, a convolutional neural network trained by using multiple domains is more robust. When a new image is processed through this trained convolutional neural network, more accurate and relevant features are generated for that image. The quality of image services that rely on such features to perform image-related operations is thereby enhanced.

In an example that illustrates the improvement to an image service, a user operates a client to request (e.g., search or browse) an image from a server. To respond, the server selects the image from a collection of images. For instance, if the client searches for an image that contains a particular gender and age, the server responds with such an image.

In this example, the server executes an image service that implements a convolutional neural network. The image service tags, indexes, and/or performs other image-related operations on the images to enable the above client-server interaction. Such operations are performed on the images based on features learned from the images. The convolutional neural network is trained across multiple training domains to learn the features. For instance, one training domain A contains known images of people, labeled with gender of the people, for gender classification. A second training dataset B contains known images of people, labeled with age of the people, for age prediction. Yet, another training dataset C contains known images of natural scenery, labeled with what each depicted scenery includes, for identification of scenery type. Because a multiple domain training is used, more generalizable feature representations are learned. These feature representations apply to age, gender, scenery, individually and in combination. Thus, when used for an image operation (e.g., image classification, tagging, and/or indexing), the feature representations enable more accurate results of the performing the image-related operations.

Next, the trained convolutional neural network processes a new image of a young man wrapping his arm around his girlfriend, where both are sitting around a campfire on a beach in the early evening to learn the features from the image. The learned features allow the image service to classify the new image as relating to youth, male and female genders, and natural scenery and to tag the image as containing a young couple, a campfire, a beach, and an evening skyline. When the client searches for a campfire beach image, the server can respond with the new image in the search results.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
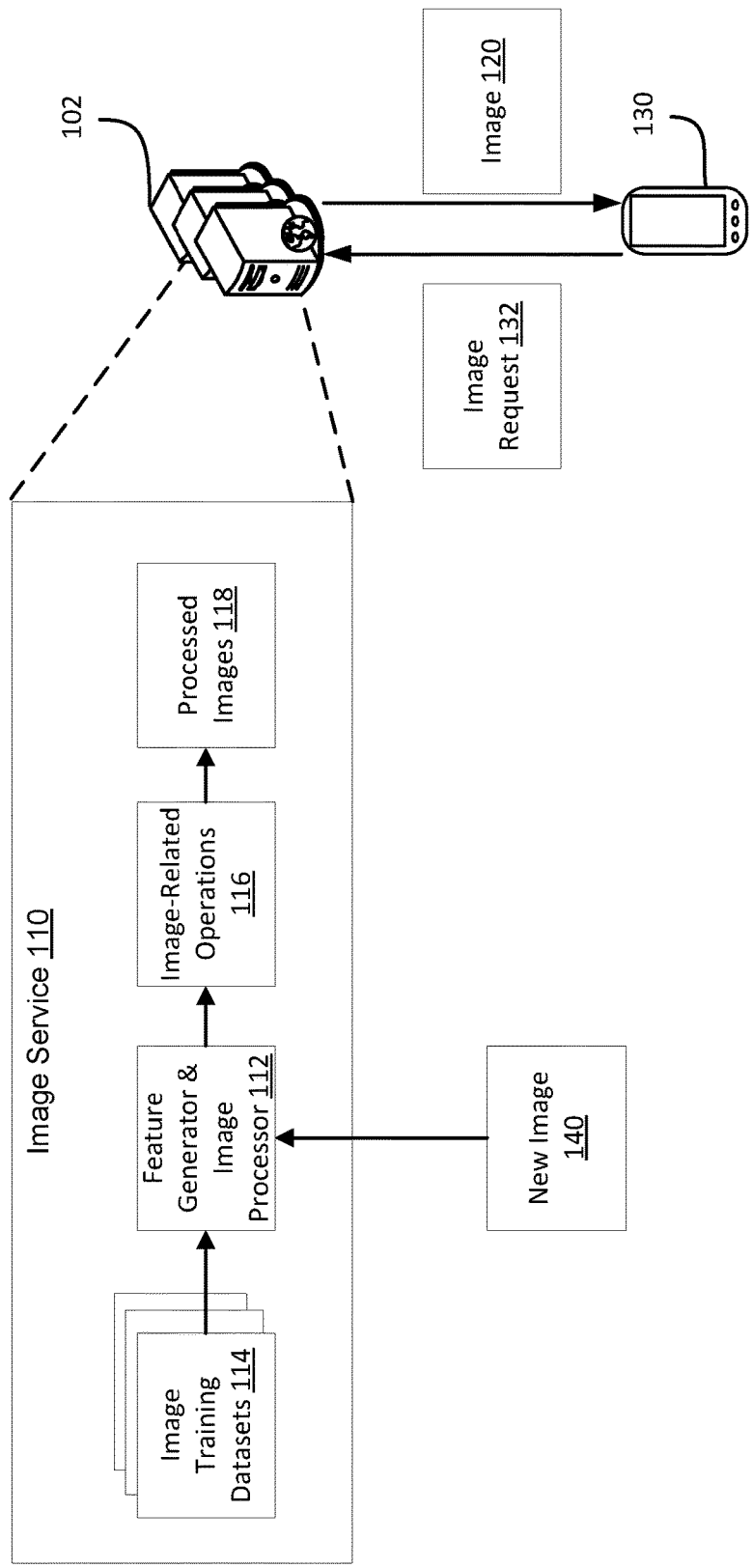
FIG. 1 illustrates an example of a client-server architecture for providing an image service, according to embodiments of the present disclosure.

Generally, the embodiments described herein involve increasing robustness of generating image features. More specifically, the robustness is increased by training a convolutional neural network across multiple training domains, where the training domains are different. Each training domain includes a training dataset and one or more associated training tasks. The convolutional neural network is trained by inputting data from each training dataset and updating the parameters of the convolution neural network according to the respective training tasks. Once updated, the parameters enable the generation of feature representations from images.

In an example, features of an image are generated based on analyzing the image, where the analysis involves the convolutional neural network. The features can be organized in a feature representation, such as a feature vector of the image. The convolutional neural network is trained to learn the features based on multiple training datasets and multiple training tasks. Each training dataset has a set of labels. The labels need not be the same across the training datasets. A training task is defined by a set of data labels and a loss function. The training updates parameters based on minimizing the loss functions. Unlike existing systems, by using multiple training datasets and multiple training tasks, the multiple domain training of the present disclosure results in more generalizable feature representations. In other words, whereas an existing system may be good at training a convolutional neural network to learn a feature (e.g., gender), the multiple domain training enables the convolutional neural network to learn that feature individually, in combination with another feature (e.g., gender and age), and to transfer knowledge about this feature to the other feature (e.g., how gender can impact an age prediction).

As used herein, a "training dataset" represents a set of known data (images with known labels) usable for training. As also used herein, a "training task" represents a task for training the convolutional neural network given a training dataset. Generally, a training task is associated with a loss function. Training involves minimizing the loss functions such that the convolutional neural network learns the best or most optimized representations of known data that satisfy the training task (e.g., what features from the images represent a label at the minimal cost).

In an example, each training dataset is mapped to an input layer of the convolutional neural network. Each training task is mapped to another layer of the convolutional neural network. For clarity of explanation, such a layer is referred to herein as an output layer. A loss function is associated with a training task mapped to the output layer. Hidden layers of the convolutional neural network are set-up between the input layers and the output layers and are trained to learn feature representations. The training includes inputting training data from the training datasets at the input layers, processing the training data through the various layers, updating the weights of the output layers such that the loss functions are minimized, and back propagating the weights to the hidden layers. The back-propagation uses, for example, a stochastic gradient descend (SGD) algorithm to cumulatively update the parameters of the hidden layers. The parameters include, for instance, weights, biases, and/or other hidden layer-related parameters. Hence, the hidden layers are trained (e.g., the parameters of this layer are updated) across the different training datasets and training tasks.

Once trained, image data of a new image is input to the convolutional neural network. Accordingly, a feature vector of the image (or some other feature representation) is an output from the convolutional neural network.

The multiple dataset and task training differs from existing trainings of a convolutional neural network in many aspects. These aspects include, for example, data augmentation, multiple task training, and model averaging. In particular, the disclosed training allows data augmentation from multiple training domains. In particular, the training involves larger amount of training datasets, each of which can have a focus on particular features. In addition, the training datasets need not have the same labels. Thus, there is no need to re-label diverse training datasets. Instead, the training datasets can be used as currently labeled. In addition, because a label generally relates to a training task, training tasks can applied across multiple training datasets. The training across these datasets and tasks also represent, in a way, an averaging of individual trainings (e.g., individual training for each dataset and task). This averaging is achieved without the computational burden of performing the individual trainings separately and subsequently combining them in a collective training.

In comparison to the existing trainings, using multiple dataset and training tasks provides various technical advantages, as further described in the present disclosure. For example, augmenting the training data is more flexible because different training datasets can be used regardless of the data labels and/or the training tasks. In another example, the feature-learning results in more generalizable feature representations and is more robust to, for example, label noise, imbalance of label distribution, and shift in data distribution. In yet another example, the computational burden is reduced relative to training individual models, where each individual model is specific to a training dataset and training task.

These technical advantages also positively affect the operations (e.g., classification, tagging, indexing, retrieval) of an image-related service. In particular, the operations become more accurate and can use a larger and more diverse collection of images. These improvements translate to an overall better quality of service.

In an illustration, the image-related service maintains a large collection of images, in the thousands and even millions, for a large number of users. New images become available on a daily basis and are processed and added to the already large collection. Thousands if not millions of users also operate clients to access some or all of the images on a daily basis. Properly classifying, tagging, and indexing the images (existing or new) becomes crucial for the user access. Absent the disclosed training, the analysis of this great amount of data may sacrifice accuracy to alleviate the computational burden. In comparison, the disclosed training achieves more accuracy while also being computationally efficient.

Specific details of various exemplary embodiments of the present invention are set forth in the following description and are illustrated in FIGS. 1-10. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

Turning to FIG. 1, the figure illustrates a client-server architecture for providing an image service 110. A server 102 hosts the image service 110. A client 130 communicates with the server 102 over a data network to access functionalities of the image service 110. The data network includes a public data network, such as the Internet, and/or a private data network, such as an intranet. Example functionalities provided to the client 130 include uploading, searching, downloading, recognizing objects, and/or other functionalities related to images. Hence, the client 130 can send an image request 132 to the server 102. The server 102 responds with an image 120 or an identifier (e.g., a uniform resource locator (URL)) of a storage space storing the image 120.

In an example, the server 102 represents a suitable computing system for hosting the image service 110. The computing system can be implemented on physical resources, such as collection of servers or a server farm or within a cloud-based computing service. The client 130 represents a suitable end user device such as a mobile device, a desktop, or other computing devices capable of communication with the server 102 over a data network.

In an example, the image service 110 represents an image service application. For instance, the image service 110 implements a number of modules to maintain a collection of images and enable the applications of operations on such images. Each module can be implemented in hardware, software hosted on hardware, or a combination of hardware and software. A feature generator and image processor 112 is an example of such modules.

Generally, the feature generator and image processor 112 is configured to generate features from an image and to process the image based on the features. In an example, the configuration implements a convolutional neural network. As further illustrated in FIG. 2, the convolutional neural network learns the features (e.g., generates a feature vector). For instance, a feature layer of the convolutional neural network is trained to learn the features. In another illustration, as further described in connection with FIG. 3, the convolutional neural network also initiates the processing of the image. For instance, an output layer of the convolutional neural network is mapped to tasks. Particular tasks are selected and initiated for processing the image.

As illustrated in FIG. 1, the feature generator and image processor 112 is trained using multiple image training datasets 114. Each training dataset includes training data labeled for a particular training task. In an example, the training data can include image data corresponding to training images. The images need not be of the same resolution, size, and/or have a same file extension type. For instance, while one training dataset corresponds to low resolution JPEG images, another training dataset corresponds to high resolution BMP images. In addition, the training data need not be limited to image data. Instead, the training data can correspond to other data modalities. For instance, while one training dataset includes image data, another training dataset includes non-image data that corresponds to at least one of a text file or an audio file.

Once trained, the feature generator and image processor 112 analyzes a new image 140 (or any number of images). Such images can be published from various online sources and/or generated locally to the image service 110, periodically or at time intervals.

The analysis includes generating the features of the new image 140. For instance, image data of the new image 140 is input to the convolutional neural network. An output of the convolutional neural network is the learned features. The analysis also includes applying one or more-image related operations 116 to the new image 140 based on the features. The image-related operations 116 include, for instance, classifying, tagging, or indexing the new image 114 according to the features. The processed image is added to a collection of processed images 118. The processed images 118 represent stock images available to the client 130. For instance, the processed images 118 are classified, tagged, and/or indexed, thereby enabling the client access to various functionalities of the image service 110.

To illustrate, consider an example of three training datasets 114. Training dataset A contains known images of people for gender classification. Training dataset B contains known images of people for age prediction. Training dataset C contains known images of natural scenery for identification of scenery type. The feature generator and image processor 112 is accordingly trained. In this example, the new image 140 is for a young man wrapping his arm around his girlfriend, where both are sitting around a campfire on a beach in the early evening. Thus, the new image 140 is added as a stock image, where the stock image is classified as relating to youth, male and female genders, and natural scenery. The stock image is also tagged as containing an image of a young couple, a campfire, a beach, and an evening skyline. When a request of a client for a campfire beach image is received, the stock image can be included in the search results.

Figure 2:
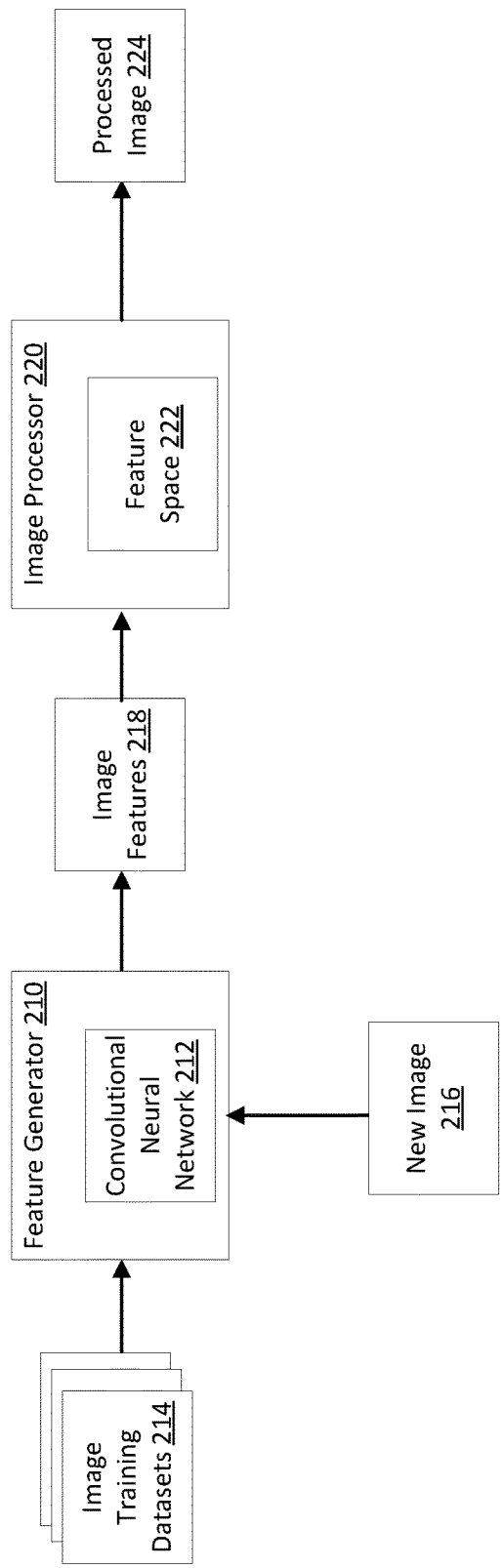
FIG. 2 illustrates an example of an implementation for generating features of an image and processing the image based on the features, according to embodiments of the present disclosure.

FIG. 2 illustrates an example of an implementation for generating features of an image and processing the image based on the features. In this example implementation, the feature generation and the image processing are distributed across multiple modules. In particular, a feature generator 210 is configured to generate image features. An image processor 220 is configured to apply one or more image related-operations according the image features to generate processed images.

In an example, the feature generator 210 implements a convolutional neural network 212. The convolutional neural network 212 is trained based on multiple training datasets 214 and respective training tasks. Accordingly, parameters of the convolutional neural network 212 are updated. Further, the convolutional neural network 212 includes a feature layer. The feature layer outputs image features usable to the image processor 220. Hence, image data of a new image 216 are input to the convolutional neural network 212. Image features 218 of the image 216 are output from the feature layer.

In an example, the image processor 220 maintains a feature space 222. The feature space 222 maps image features to known images, where these known images may have already been processed (e.g., classified, tagged, and/or indexed). For the new image 216, the image processor 220 searches the feature space for a match between the images features 218 and the mapped features. For instance, the matching uses a nearest neighbor algorithm. The nearest neighbor image(s) is selected from the feature space. Knowledge about the selected image(s) (e.g., labels, tags, and/or indexes) is transferred to the new image 216. For instance, the knowledge transfer includes updating the mapping of the feature space 222 and/or adding the knowledge to metadata of the new image 216. Accordingly, the image processor 220 stores the new image 216 with the knowledge as a processed image 224.

Figure 3:
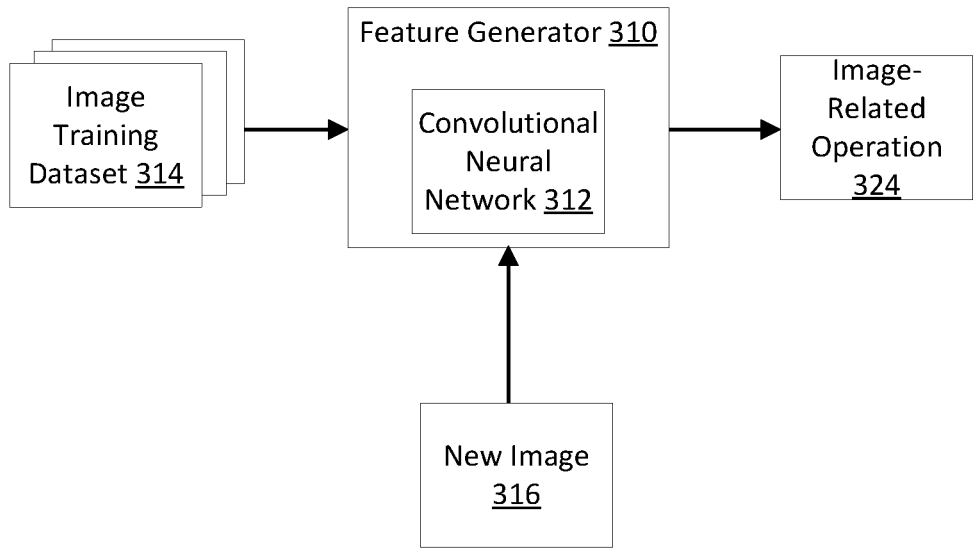
FIG. 3 illustrates another example of an implementation for generating features of an image and processing the image based on the features, according to embodiments of the present disclosure.

FIG. 3 illustrates another example of an implementation for generating features of an image and processing the image based on the features. In this example implementation, a feature generator 310 is configured to generate the image features and to initiate the application of one or more image-related operations on the image.

Similarly to the feature generator 210 described in connection with FIG. 2, the feature generator 310 implements a convolutional neural network 312. The convolutional neural network 312 is trained based on multiple training datasets 314 and respective training tasks. In this example, the convolutional neural network 312 also includes an output layer. Neurons (e.g., nodes in a structure representing the network 312) of the output layer are mapped to image-related tasks. For instance, one neuron may be associated with predicting how well a label is applicable to the image. Another neuron may be associated with predicting how well a tag is applicable to objects within the image. Accordingly, when a new image 316 is received, the output layer outputs predictions across different image-related tasks. The feature generator 210 selects a set of the tasks based on the respective predictions. For instance, the image-related task having the highest likelihood or image-related task(s) having likelihood(s) over a likelihood threshold is selected. The feature generator 210 initiates the selected image-related task(s), thereby causing one or more image-related operations to be applied to the new image 316. For instance, the selected task relates to a prediction that a label has the highest likelihood of being applicable to the image. Accordingly, an image-related operation is applied to add the label to the image and/or classify the image based on the label.

Figure 4:
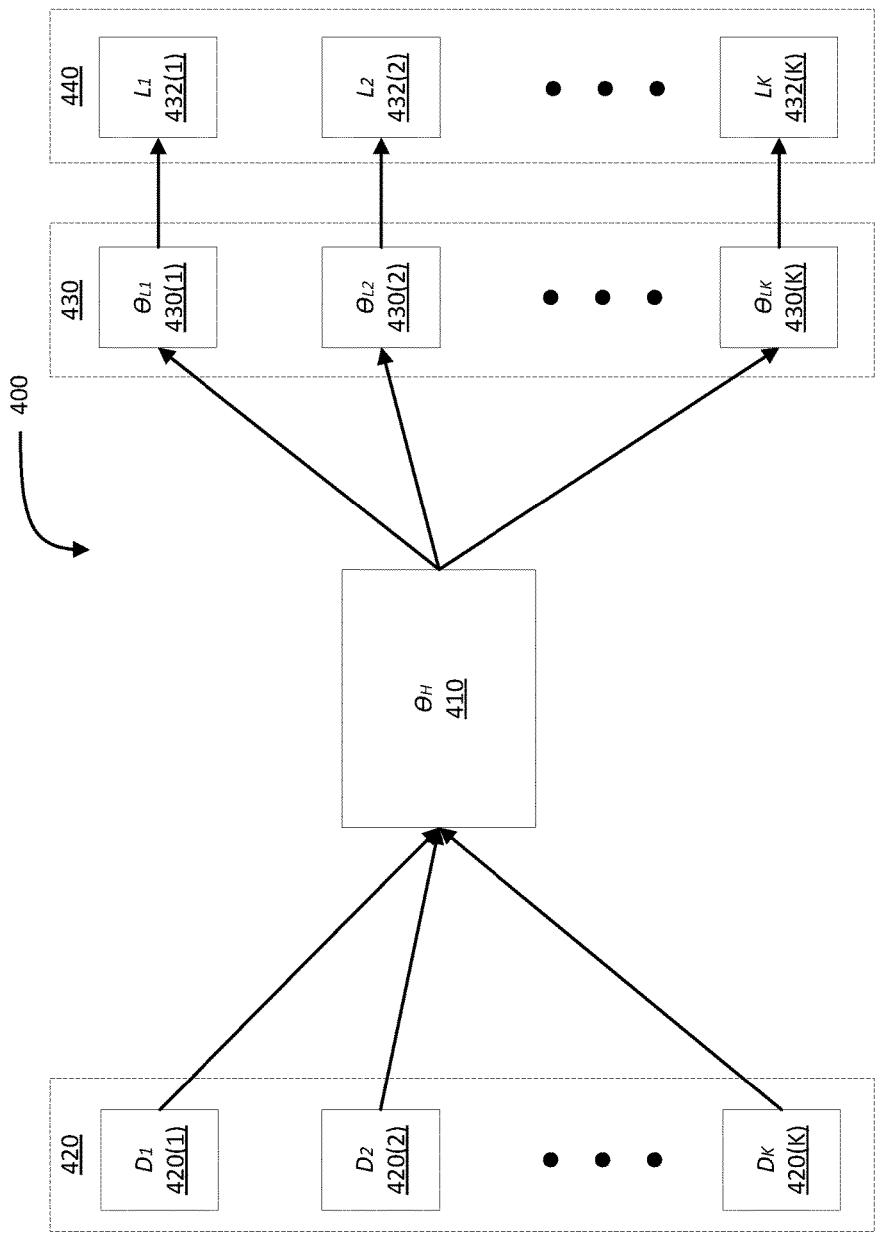
FIG. 4 illustrates an example of a convolutional neural network that is trained across multiple training datasets and multiple training tasks, according to embodiments of the present disclosure.

FIG. 4 illustrates an example of a convolutional neural network 400 that is trained across multiple training datasets and multiple training tasks. As illustrated, the convolutional neural network 400 includes a hidden layer 410. Although a single hidden layer 410 is illustrated, the hidden layer 410 itself can include a hierarchy of a number of hidden layers. One end of the hierarchy is connected to an input layer 420 of the convolutional neural network 400. Another end of the hierarchy is connected to an output layer 430 of the convolutional neural network 400.

The input layer 420 maps input data of, for example, images to input neurons of the convolutional neural network 400. As illustrated, during the training of the convolutional neural network 400, "K" training datasets are used, where "K" is an integer equal or greater than two. Hence, the training datasets 420(1), 420(2), ..., 420(K) are mapped to the input layer 420. In an example, each training dataset is mapped to a collection of the input neurons and has a set of labels.

The output layer 420 maps tasks to output neurons of the convolutional neural network 400. As illustrated, during the training of the convolutional neural network 400, "K" training tasks are used. Hence, the training tasks 430(1), 430(2), . . . 430(K) are mapped to the output layer 430. In an example, each training task is mapped to a collection of the output neurons. In addition, each training task corresponds to at least one training dataset that has a set of labels. The training task is also associated with a training loss function, such as a regression loss or a classification loss. FIG. 4 represents this association with a loss layer 440. The loss layer 440 includes "K" training loss functions 432(1), 432(2), . . . , 432(K). Each training loss function corresponds to a training task. During the training, a training loss function for a training task imposes a training loss (e.g., a cost or a penalty) for a deviation between a predicted label and a true label given the training task and the respective training dataset and set of labels. The training aims at minimizing the training loss. A training domain may refer to training dataset and training task that are related, where the training dataset has a set of labels and where the training task is associated with a loss function.

The hidden layer 410 includes a number of layers, such as a convolutional layer and a fully connected layer (e.g., a high-level reasoning layer having neurons connected to lower-level layers and capable of generating feature representations from inputs to such lower-level layers). Each layer uses a set of parameters, such as weights and biases. The training aims at updating the parameters given the minimization of training losses across the loss layer 440. In an example, the parameters are optimized using a backpropagation algorithm, such as a stochastic gradient descend (SGD) algorithm.

In an example, the formulation of the training is expressed as following. Annotate the training domains as $\{(D_1, L_1), (D_2, L_2), \ldots, (D_K, L_K)\}$, where "$D_i$" and "$L_i$" represent the training data and the training loss function for a training domain. Training for each training domain can be represented as the following optimization problem:

$$\min_{\theta_H, \theta_{L_i}} L_i(D_i; \theta_H, \theta_{L_i}).$$

"$\theta_H$" represents the parameters for the hidden layer 410. These parameters are used to compute the feature embedding (e.g., to generate a feature representation as an output from a fully connected layer of the hidden layer 410). "$\theta_{L_i}$" represents the parameters for the output layer, including linear weights applied on the feature space for a specific task. The goal of the feature training is to learn a good hidden layer configuration "$\theta_H$."

For the multiple domain training (e.g., multiple training datasets and multiple training tasks), the optimization problem can be expressed as:

$$\min_{\theta_H, \theta_{L_1}, \ldots, \theta_{L_K}} \sum_{i=1}^{K} w_i L_i(D_i; \theta_H, \theta_{L_i}), \quad (1)$$

where "$w_i$" is the weight for a domain in the training process. In an example, equation (1) is optimized using SGD.

For clarity of explanation, FIG. 4 illustrates "K" training datasets and "K" training tasks. However, a one-to-one relationship need not exist between training datasets and training tasks. Instead, each training dataset can relate to a number of training tasks. Conversely, each training task can relate to a number of training datasets. To illustrate, consider the example of the following training domain. A single training dataset relates to "M" training tasks, where "M" is equal or greater than two. In this example, the training dataset is mapped to the input layer 420. Likewise, each of the "M" training tasks is mapped to the output layer 430 and is associated with an individual loss function. The training loss function for the training domain is updated to include the sum of the individual loss functions.

Figure 5:
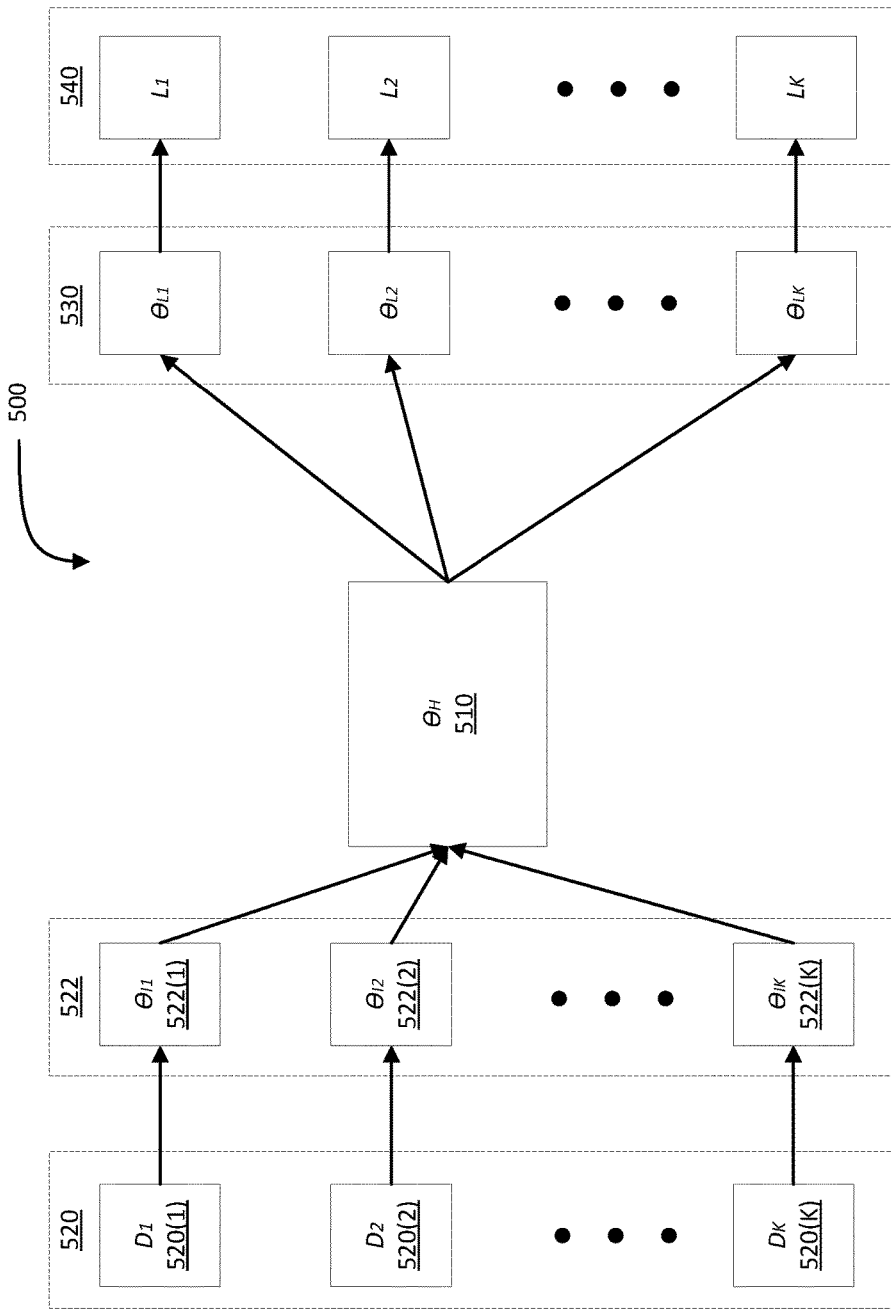
FIG. 5 illustrates another example of a convolutional neural network that is trained across multiple training datasets and multiple training tasks, according to embodiments of the present disclosure.

FIG. 5 illustrates another example of a convolutional neural network 500 that is trained across multiple training datasets and multiple training tasks. The convolutional neural network 500 includes similar layers as those of the convolutional neural network 400 of FIG. 4, such as a hidden layer 510, an input layer 520, an output layer 530, and a loss layer 540. Similarities are not repeated herein in the interest of clarity. In addition to these layers, the convolutional neural network 500 includes a transformation layer 522.

In particular, and as previously described, the training datasets 520(1), 520(2), . . . , 520(K) need not use the same format for the training data. For instance, the training dataset 520(1) can include image data for training images of a certain size, resolution, or file format. In comparison, the training dataset 520(2) can include image data for training images of a different size, resolution, or file format. On the other hand, the training dataset 520(K) can include non-image data, such as text data or audio data. In this case, the transformation layer 522 is configured to generate a feature representation (e.g., a feature vector) from each training dataset, where the feature representation uses a uniform format (e.g., a common feature vector format to the different feature vectors). The various feature representations are then input to the hidden layer 510. Thus, the transformation layer 522 transforms the training datasets that have different data formats into training feature sets 522(1), 522(2), . . . , 522(K), that have a uniform format.

In an example, the transformation layer 522 implements a feature embedding function to generate (e.g., learn) the training feature sets 522(1), 522(2), . . . , 522(K). For instance, during the training of the convolutional neural network 500, the parameters "$\theta_{L_i}$" of the transformation layer 522 also updated through a backpropagation algorithm. In another illustration, the transformation layer 522 represents on its own a neural network (e.g., a convolutional neural network) or a convolutional layer. In this illustration, the transformation layer 522 is trained to learn the features given the format type of the training data. In other words, the transformation layer 522 is trained to generate the features from image data and non-image data given the specific data formats.

FIGS. 6-9 illustrate example flows for training and using a feature generator, such as one that implements a convolutional neural network. For illustrative purposes, a computer system is illustrated as performing operations of the illustrative flows. The computer system implements some or all of the components and modules illustrated in FIGS. 1-5, including the feature generator. Nevertheless, other systems, or specific modules hosted on such systems, can be configured to implement one or more of the operations and/or one or more steps of the operations. In addition, while the operations are illustrated in a particular order, it should be understood that no particular order is necessary and that one or more operations may be omitted, skipped, and/or reordered. Similarities between the operations across the example flows are not repeated.

Figure 6:
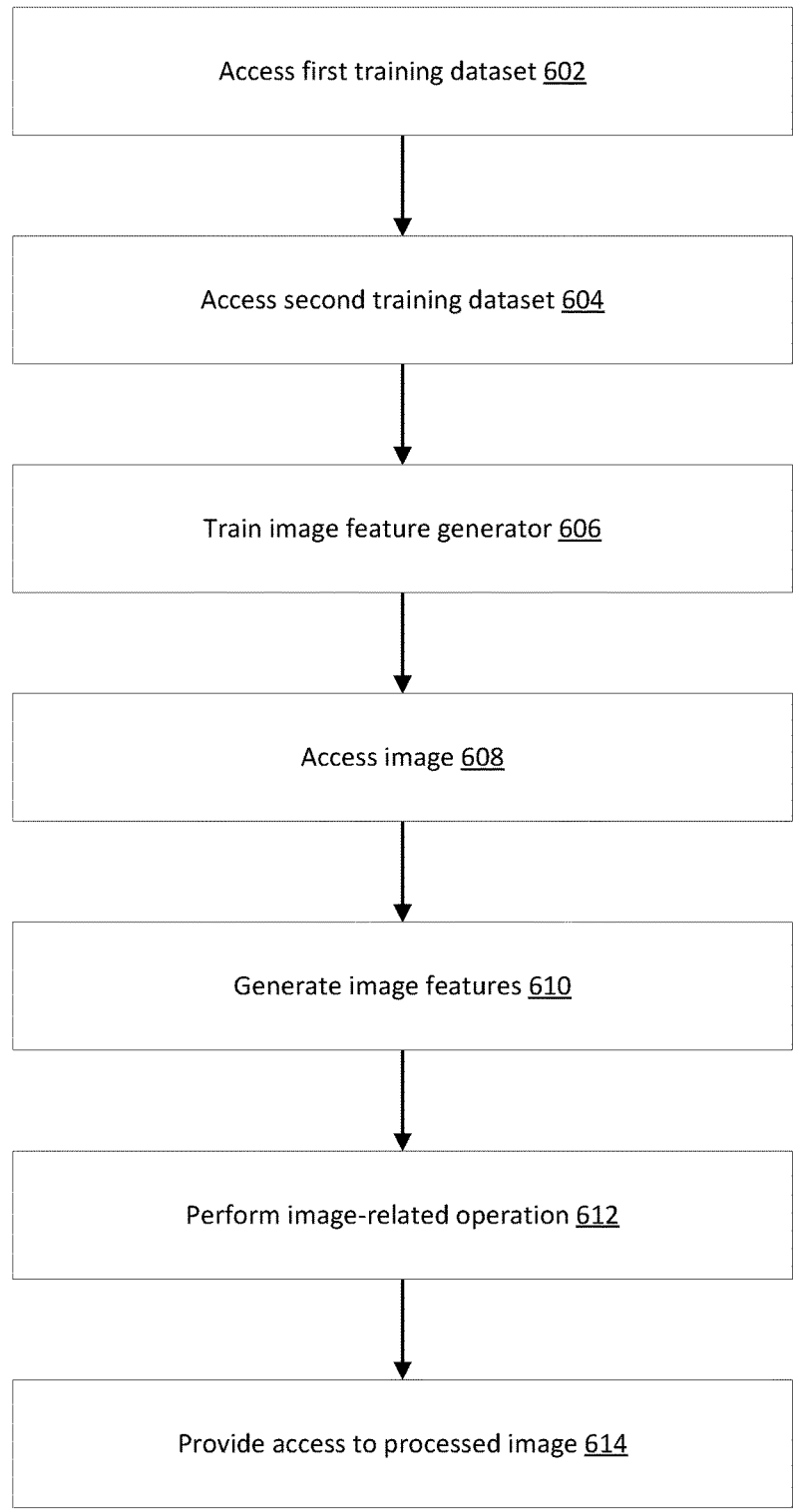
FIG. 6 illustrates an example of a flow for training a feature generator, generating features from image data of an image, and performing an image-related operation based on the features, according to embodiments of the present disclosure.

FIG. 6 illustrates an example of a flow for training the feature generator, generating features from image data of an image, and performing an image-related operation based on the features. The example flow starts at operation 602, where the computer system accesses a first training dataset. In an example, the first training dataset is available from local storage of the computer system or from remote storage accessible over a data network. The first training dataset corresponds to a first training domain and includes image data of training images and a set of data labels. The first training domain also includes a first training task defined based on the data labels and associated with a first training loss function.

At operation 604, the computer system accesses a second training dataset. The second training dataset corresponds to a second training domain. Further, the second training dataset includes image or non-image data and a set of data labels. The second training domain also includes a second training tasks defined based on the data labels and associated with a second training loss function.

For illustrative purposes, two training datasets and two training tasks are illustrated in the example flow of FIG. 6. However, a larger number of training datasets and/or of training tasks can also be similarly used for the training of the feature generator, as described in connection with FIGS. 1-5.

At operation 606, the computer system trains the image feature generator based on the first training dataset and the second training dataset. In an example, the training includes updating parameters of the feature generator. In particular, the feature generator implements a convolutional neural network, such as the one described above with respect to FIG. 4 or FIG. 5. The training includes minimizing the training loss functions of the training domains as expressed in equation (1) above. For instance, the sum of the first loss function and the second loss function is minimized. The minimization corresponds to a set of optimized parameters of an output layer of the convolutional neural network. Parameters of the hidden layer(s) of the convolutional neural network are updated based on a backpropagation algorithm, such as one that uses SGD.

At operation 608, the computer system accesses an image. In an example, the image is published from a computing source or is generated locally at the computer system. In another example, the image is received from a client in communication with the computer system. Regardless of the image source, the computer system accesses the image in order to perform an image-related operation such as to classify, tag, or index the image.

At operation 610, the computer system generates image features for the image. In an example, image data of the image is input to the feature generator. An output of the feature generator includes a feature vector (or, more generally, some other feature representation) of the image. In particular, the feature vector includes features learned by the convolutional neural network. The learning is based on a feature embedding function of the convolutional neural network as defined, in part, by the parameters of the convolutional neural network through the training.

At operation 612, the computer system performs an image-related operation on the image based on the image features. In an example, the feature vector enables an application of the image-related operation to the image. For instance, the computer system implements an image processor, as described in connection with FIG. 2. The image processor maintains a feature space of known images and associated knowledge (e.g., labels, tags, and indexes). The computer system matches the feature vector to at least one known feature vector from the feature space. The matching uses a nearest neighbor algorithm. The known feature vector corresponds to a known image. The computer system transfers the knowledge about the known image to the image. The knowledge enables the application of the image-related operation (e.g., if a label is added to the image, the image is classified according to the label). In another example, the feature generator initiates the image-related operation without using the feature space, as described in connection with FIG. 3.

For instance, a layer of the convolutional neural network, such as a fully connected layer, predicts image-related tasks (e.g., how well a label applies to an image or how well a tag applies to an object within an image). Accordingly, an image-related task that has an acceptable likelihood (e.g., one exceeding a threshold) is selected and initiated, leading to the application of a respective image-related operation. For instance, if adding a particular label has the highest likelihood, the addition of the particular label to the image is initiated. The addition enables the classification of the image according to the particular label.

At operation 614, the computer system provides access to a processed image. In an example, the access is provided to a client in communication with the computer system over a data network. The processed image represents the image after the application of the image-related operation. For instance, the processed image is a stock image that has been classified, tagged, or indexed. The client can search, browse, or retrieve the stock image.

Figure 7:
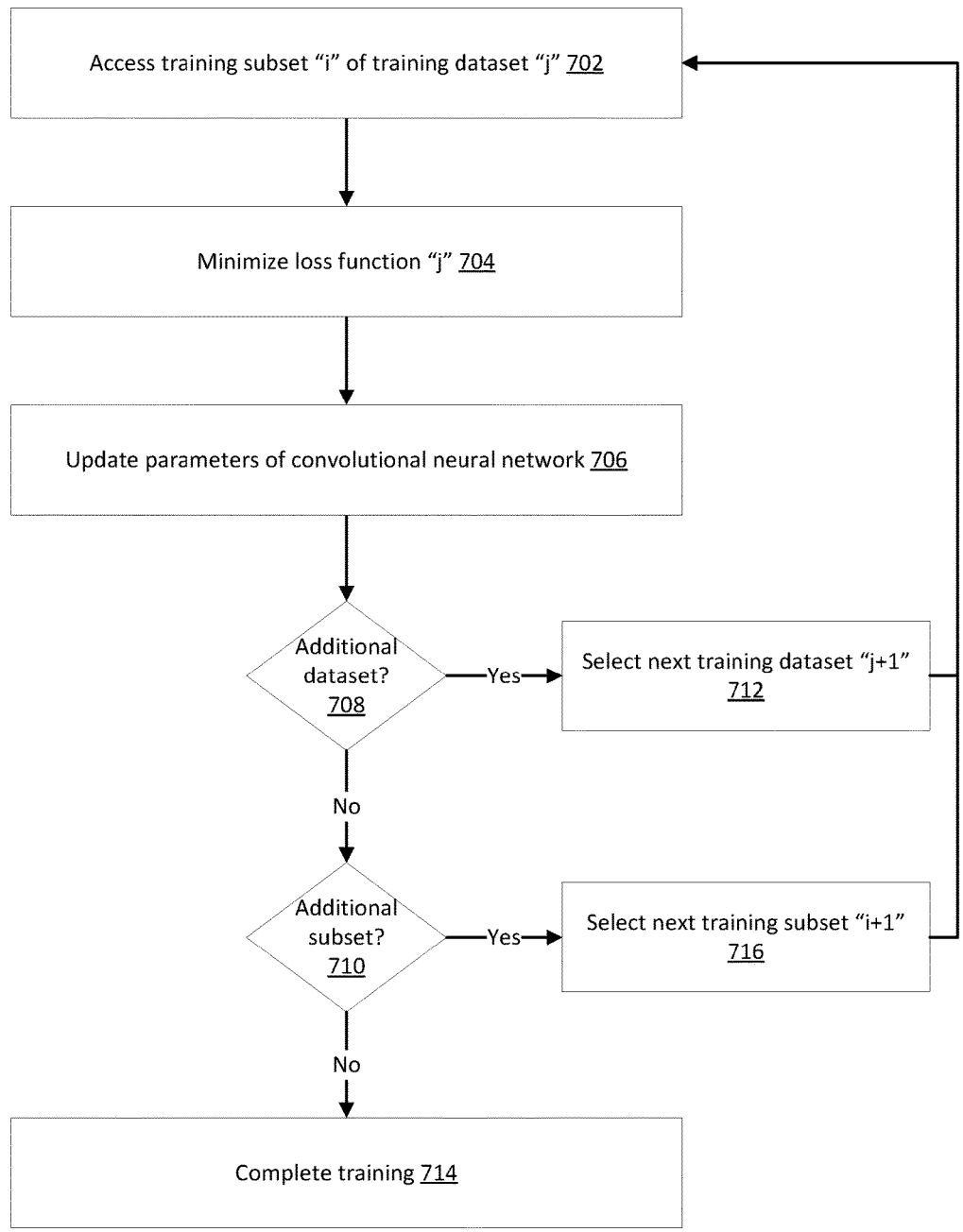
FIG. 7 illustrates an example of a flow for training a feature generator based on batches of training data, according to embodiments of the present disclosure.

FIG. 7 illustrates an example of a flow for training the feature generator based on batches of training data. In particular, multiple training datasets are used for the training. Each training dataset is divided in a number of subsets. During the training, the subsets are input to the feature generator in sequential batches. The batch training can improve the computational burden associated with training of the feature generator (e.g., of the convolutional neural network).

The example flow starts at operation 702, where the computer system accesses a training subset "i" of a training dataset "j." For example, "K" training datasets are available, where "K" is an integer equal or greater than two. Each of the training datasets is divided in "M" training subsets. Hence, the computer system accesses, for instance, the first training subset of the first training dataset, then the first training subset of the second training dataset, and so on and so forth until all "M" training subsets across all "K" training datasets have been accessed as further illustrated in the next operations.

At operation 704, the computer system minimizes the loss function "j." In particular, at this operation, the computer system inputs the accessed training subset "i" of the training dataset "j" to the convolutional network. The loss function "j" corresponds to the training dataset "j." The loss function "j" is minimized by optimizing parameters of the output layer given the training subset "i." To illustrate, the computer system accesses the third training subset of the second training dataset. The second training dataset is associated with a second loss function. The second training loss is minimized by optimizing the parameters given the third training sub set.

At operation 706, the computer system updates the parameters of the convolutional neural network. These parameters are updated based on the minimization of the loss function "j." For instance, a backpropagation algorithm, such as one using SGD, is applied for the update. Continuing with the previous illustration, the convolution neural network is trained based on applying the backpropagation algorithm once the second loss function is minimized.

At operation 708, the computer system determines whether additional training datasets exist or not. If the training subsets "i" for all "K" training datasets have been analyzed, operation 710 is followed. Otherwise, operation 712 is followed, where the computer system selects the next training dataset "j+1." The computer system then accesses the subset for the next training subset "j+1," thereby iteratively performing operations 702-708. To illustrate, consider the example of three training datasets. In this example, the computer system has already batched trained the convolutional network using first training subsets from only the first two training datasets. Accordingly, the computer system selects the third training dataset and continues the batch training using the first training subset of the third training dataset.

At operation 710, the computer system determines whether additional training subsets exist or not. If the "M" training subsets have been used, the training is complete as indicated at operation 714. Otherwise, the computer system determines that other training subset(s) have not been used yet. Accordingly, at operation 716, the computer system selects the next training subset "i+1." The computer system then accesses the next training subset, thereby iteratively performing operations 702-710. To illustrate and continuing with the previous three training datasets example, if the computer system determines that the second training subset of the first training dataset has not been used yet, the computer system accesses this second training subset and accordingly continues training the convolutional neural network.

In an example, the above training of FIG. 7 uses a frequency for forward and back propagations. In other words, the training alternates mini-batches of datasets (e.g., alternates the training subsets "i" across the different training datasets "j") at a particular frequency. The frequency can be expressed as a number of iterations. For instance, the convolutional neural network is trained with one hundred iterations (or some other number of iterations) by using a training subset of one training dataset, then one hundred iterations (or some other number that need not be the same as the first number of iterations) with a next training subset of a next training dataset, and so on and so forth until the training completes.

Figure 8:
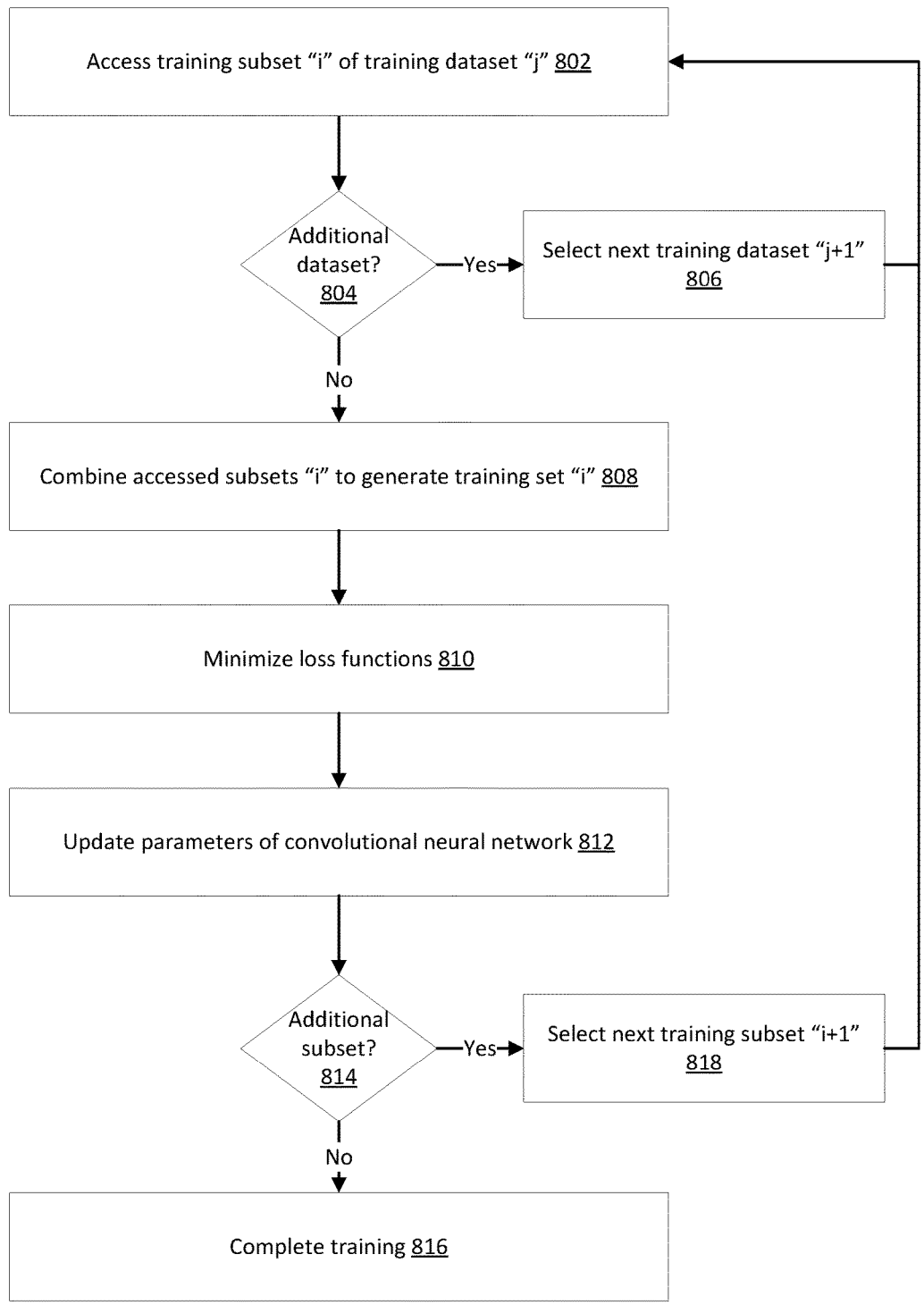
FIG. 8 illustrates another example flow for training a feature generator based on batches of training data, according to embodiments of the present disclosure.

FIG. 8 illustrates another example of a flow for training the feature generator based on batches of training data, according to embodiments of the present disclosure. In this example, training subsets from different training datasets are combined such that the batch training of the convolutional network across the training datasets is performed in a parallel manner.

The example flow starts at operation 802, where the computer system accesses a training subset "i" of a training dataset "j." At operation 804, the computer system determines if additional training datasets exist. If so, operation 806 is performed, where the computer system selects the next training dataset "j+1" to access the training subset "i" of the next training dataset "j+1," thereby iteratively repeating operations 802-804. To illustrate, consider the example of three training datasets. Each training dataset is divided into two training subsets. The computer system determines that the first training subset of the first training dataset has been accessed. In this example, the computer system also determines that the first training subset of the second training dataset has not been accessed yet. Accordingly, the computer system accesses the first training subset of the second training. The access is also repeated across the third training dataset.

At operation 808, the computer system combines the accessed training subsets "i" across the "K" training datasets. The computer system accordingly generates a training set "i" that combines the training subsets "i." In the previous example, the computer system combines all three first training subsets of the three training datasets to form a first training set. In an example, the combination allows the computer system to track the source of training data (e.g., which training subset of which training dataset does the training data belong to). The tracking is used in the minimization of the loss functions. For instance, the combination includes interleaving the training data of the training subsets "i." For instance, the training set "i" is expressed as $S_i$: $\{(d_{i1,1}, \ldots d_{iK,1})\}; \ldots ; \{(d_{i1,N}, \ldots d_{iK,N})\}$, where "$d_{ij,l}$" represents training data "$d_l$" from training subset "i" of training dataset "j."

At operation 810, the computer system minimizes loss functions across the "K" training datasets. For example, the computer system inputs the training set "i" to the convolutional neural network and minimizes the sum of the loss functions, as expressed in equation (1). In this example, the loss function "j" of a training dataset "j" is computed based on the training data corresponding to the training dataset "j." In other words, by tracking the source of the training data in the training set "i," as explained at operation 808, the computer system can properly compute the training loss functions.

At operation 812, the computer system updates the parameters of the convolutional neural network. These parameters are updated based on the minimization of the loss functions. For instance, a backpropagation algorithm, such as one using SGD, is applied for the update.

At operation 814, the computer system determines whether additional training subsets exist or not. If the "M" training subsets have been used, the training is complete as indicated at operation 816. Otherwise, the computer system determines that other training subset(s) have not been used yet. Accordingly, at operation 818, the computer system selects the next training subset "i+1." The computer system then accesses the next training subset, thereby iteratively performing operations 802-814. To illustrate and continuing with the previous three training datasets example, if the computer system determines that the second training subsets have not been used yet, the computer system accesses the second training subsets across the three training datasets to form a second training set and accordingly continue training the convolutional neural network.

In an example, the above training of FIG. 8 need to use the same size of training subsets to create a training set. Instead, training samples can be combined from different datasets with a proportion to balance the training according to a desired application. In other words, wherein a first training subset from a first training dataset is combined with a second training subset from a second training dataset, the first and second training subsets can have different sizes. For instance, the first training subset includes one hundred training samples (or some other number), while the second training subset includes fifty training samples (or some other number) corresponding to a 2:1 proportion. The proportion can be decided by an operator setting up the training of the convolutional network. The operator can consider multiple factors including, for example, whether to bias or balance the training towards a particular training dataset or training task associated with the training dataset. For instance, if the first training dataset is more relevant to a particular application, the proportion can increase the number of training samples used from the first training dataset relative to the second one.

Figure 9:
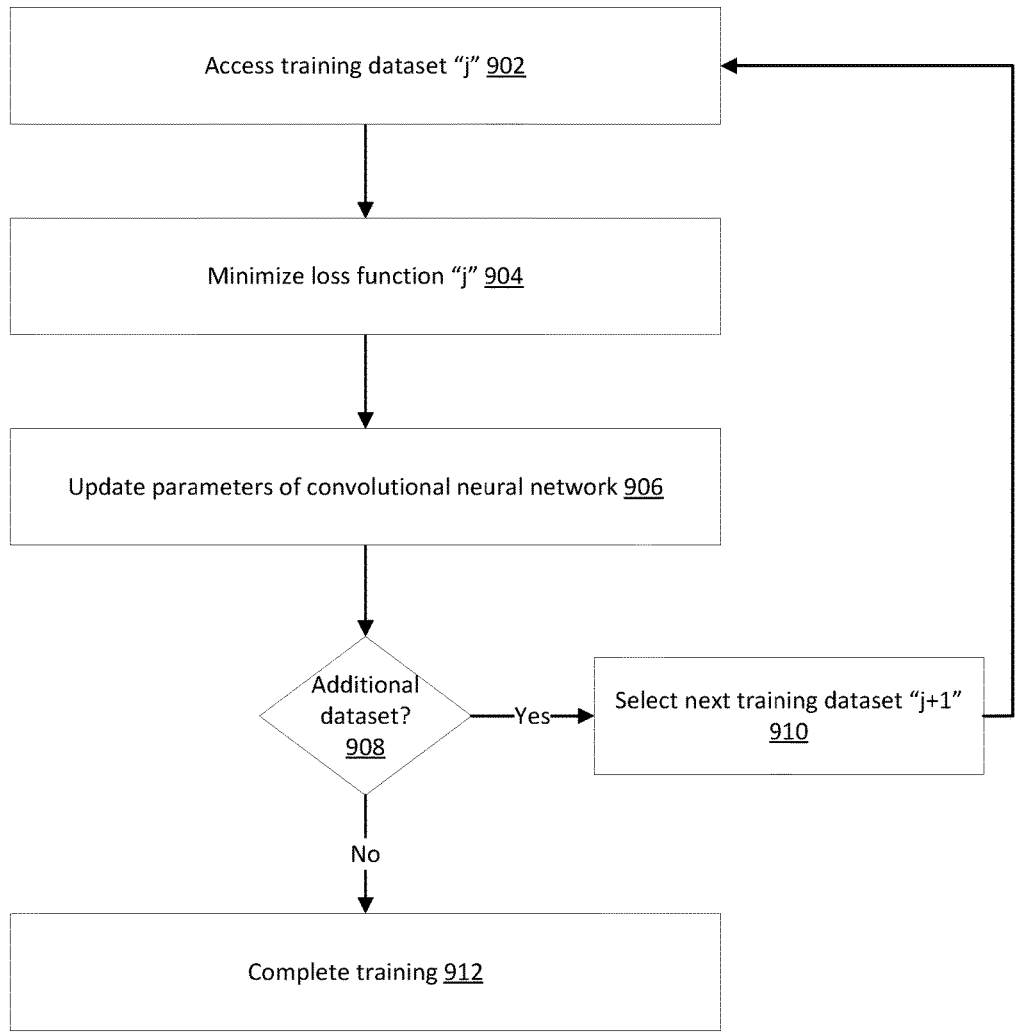
FIG. 9 illustrates another example flow for training a feature generator based on batches of training data, according to embodiments of the present disclosure.

FIG. 9 illustrates another example of a flow for training the feature generator based on a sequential training approach. In particular, multiple training datasets are used for the training. Instead of dividing each training dataset into batches as illustrated in FIGS. 7 and 8, the training datasets are sequentially input to the feature generator. In other words, a first training dataset is first input to train the feature generator. Once that training is complete, the next training dataset is input for additional training and so and so forth until the feature generator is trained across all of the desired training datasets.

The example flow starts at operation 902, where the computer system accesses a training dataset "j." For example, "K" training datasets are available, where "K" is an integer equal or greater than two. Hence, the computer system accesses, for instance, the first training dataset, then the next training dataset, and so on and so forth until all "K" training datasets have been accessed as further illustrated in the next operations.

At operation 904, the computer system minimizes the loss function "j." In particular, at this operation, the computer system inputs the accessed training dataset "j" to the convolutional network. The loss function "j" corresponds to the training dataset "j." The loss function "j" is minimized by optimizing parameters of the output layer given the training first loss function. The first training loss is minimized by optimizing the parameters given the training samples from the first training dataset.

At operation 906, the computer system updates the parameters of the convolutional neural network. These parameters are updated based on the minimization of the loss function "j." For instance, a backpropagation algorithm, such as one using SGD, is applied for the update. Continuing with the previous illustration, the convolution neural network is trained based on applying the backpropagation algorithm once the first loss function is minimized. In an example, the parameters of the shared convolutional neural network are fixed once the updated is complete. At a next iteration of the training, a next training dataset is used to fine tune the output layer (e.g., to minimize the loss function associated with the next training dataset).

At operation 908, the computer system determines whether additional training datasets exist or not. If so, operation 910 is followed, where the computer system selects the next training dataset "j+1." The computer system then accesses the next training dataset "j+1," thereby iteratively performing operations 902-908. Continuing with the previous example, the computer system has already trained the convolutional network using first training dataset. Accordingly, the computer system selects the second training dataset and continues the training. On the other hand, if no remaining datasets exist, operation 912 is followed, where the computer system completes the training.

Figure 10:
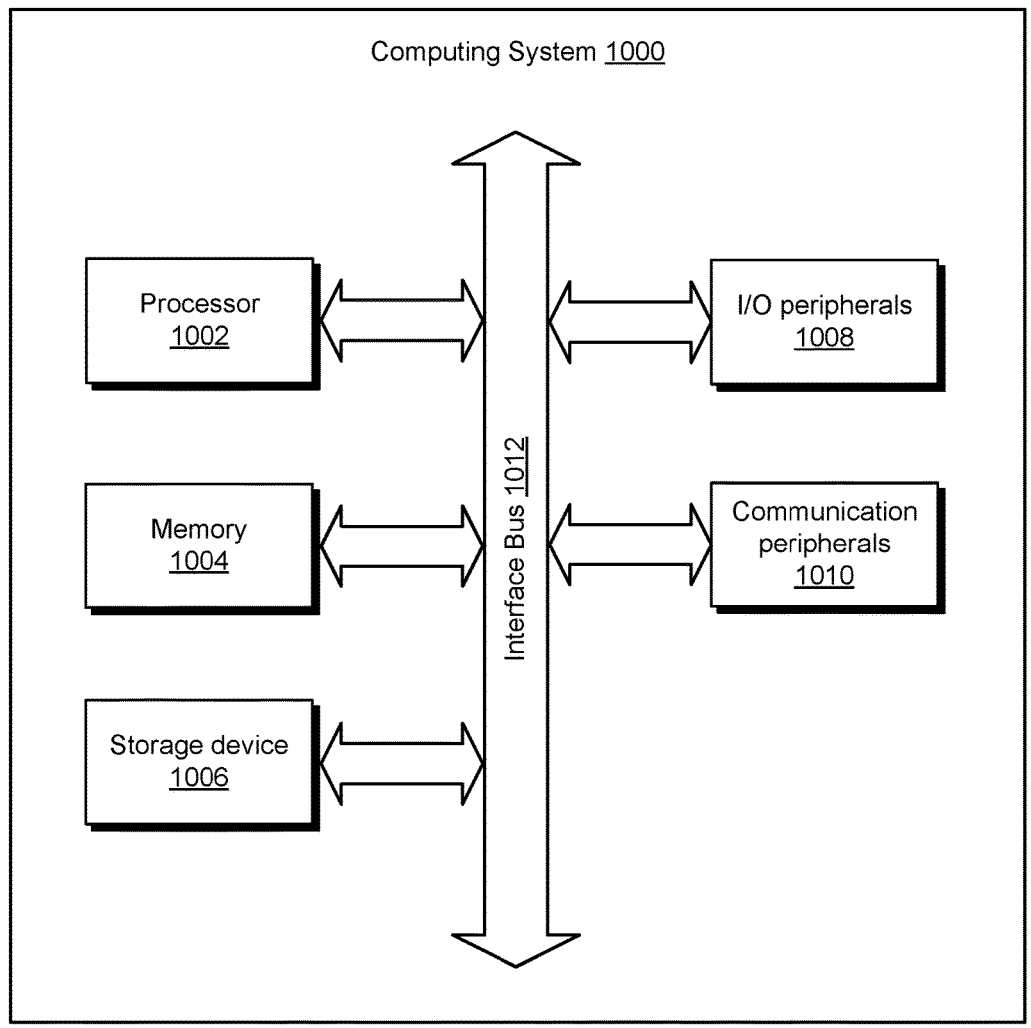
FIG. 10 illustrates an example of a computing environment suitable for use in embodiments of the present disclosure.

Turning to FIG. 10, the figure illustrates examples of components for implementing some or all of the components of a computer system 1000. The computer system 1000 is an example of any of the computer systems described in connection with FIGS. 1-8. In an example, the computer system 1000 implements the image service 110 of FIG. 1. Although these components are illustrated as belonging to a same computing system 1000, the computing system 1000 can be distributed.

The computing system 1000 includes at least a processor 1002, a memory 1004, a storage device 1006, input/output peripherals 1008, communication peripherals 1010, and an interface bus 1012. The interface bus 1012 is configured to communicate, transmit, and transfer data, controls, and commands among the various components of the computing system 1000. The memory 1004 and the storage device 1006 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1004 and the storage device 1006 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 1000.

Further, the memory 1004 includes an operating system, programs, and applications. The processor 1002 is configured to execute the stored instructions and includes, for example, a logical processing unit, a microprocessor, a digital signal processor, and other processors. The memory 1004 and/or the processor 1002 can be virtualized and can be hosted within another computing system of, for example, a cloud network or a datacenter. The input and output peripherals 1008 include user interfaces such as a keyboard, screen, microphone, speaker, other input/output devices, and computing components such as graphical processing units, serial ports, parallel ports, universal serial bus, and other input/output peripherals. The input/output peripherals 1008 are connected to the processor 1002 through any of the ports coupled to the interface bus 1012. The communication peripherals 1010 are configured to facilitate communication between the computing system 1000 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for increasing robustness of a convolutional neural network that supports at least one of image classification, image tagging, or image retrieval, the computer-implemented method comprising:
   accessing, by a computer system, a first training dataset comprising first image data, the first training dataset associated with a first image-related task and a first label applicable to the first image data;
   accessing, by the computer system, a second training dataset comprising second training data, the second training dataset associated with a second task and a second label;
   training, by the computer system, the convolutional neural network by at least:
      minimizing a first loss function for the first training dataset based on the first image-related task and a second loss function for the second training dataset based on the second task, and
      updating parameters of the convolutional neural network based on the minimizing of the first loss function and the second loss function;
   inputting, by the computer system, image data of an image to the convolutional neural network; and
   generating, by the computer system, a feature vector for the image based on the parameters of the convolutional neural network, the feature vector enabling an application of an image-related operation to the image, the image-related operation comprising at least one of the image classification, the image tagging, or the image retrieval.

2. The computer-implemented method of claim 1, wherein the computer system comprises an image service application configured to implement the convolutional neural network, the image service application is accessible to a client device over a data network and further configured to provide images to the client device based on the image-related operation.

3. The computer-implemented method of claim 1, further comprising:
   mapping the first training dataset to an input layer of the convolutional neural network;
   mapping the first image-related task to an output layer of the convolutional neural network; and
   configuring a fully connected layer of the convolutional neural network to generate features from the image data, wherein the fully connected layer is connected with the output layer, and wherein the training further comprises:

computing weights of the output layer based on the minimizing of the first loss function, and back-propagating the weights to the fully connected layer.

4. The computer-implemented method of claim 1, wherein the first image-related task and the second task are mapped to respective output layers of the convolutional neural network, and wherein training the convolutional neural network comprises iteratively:

generating a training subset by combining data from the first training dataset and the second training dataset;

inputting the training subset to the convolutional neural network;

updating weights of the output layers by minimizing the first loss function and the second loss function based on the training subset; and updating the parameters of the convolutional neural network based on the weights of the output layers.

5. The computer-implemented method of claim 4, wherein the training subset combines a user-defined proportion of first data from the first training dataset and second data from the second training dataset.

6. The computer-implemented method of claim 1, further comprising mapping the first image-related task and the second task to respective output layers of the convolutional neural network, and wherein training the convolutional neural network comprises iteratively:

inputting first data of the first training dataset to the convolutional neural network;

updating first weights of a first output layer by minimizing the first loss function based on the first data;

updating the parameters of the convolutional neural network based on the first weights of the first output layer;

inputting second data of the second training dataset to the convolutional neural network;

updating second weights of a second output layer by minimizing the second loss function based on the second data; and updating the parameters of the convolutional neural network based on the second weights of the second output layer.

7. The computer-implemented method of claim 6, wherein updating the first weights comprises iteratively training the convolutional neural network for a predetermined number of iterations prior to inputting the second data of the second training dataset.

8. The computer-implemented method of claim 1, further comprising: mapping the first image-related task and the second task to respective output layers of the convolutional neural network, and wherein training the convolutional neural network comprises:

inputting the first training dataset to the convolutional neural network;

updating shared layers of the convolutional neural network by minimizing the first loss function based on the first training dataset;

inputting the second training dataset to the convolutional neural network; and tuning an output layer corresponding to the second training dataset by minimizing the second loss function based on the second training dataset.

9. The computer-implemented method of claim 1, wherein the second training dataset comprises second image data, wherein at least of: the second task is different from the first image-related task or the second label is different from the first label.

10. The computer-implemented method of claim 1, wherein the first training dataset and the second training dataset are associated with different data formats, and further comprising: mapping the first training dataset and the second training dataset to respective input layers of the convolutional neural network, wherein the input layers are configured for generating input feature vectors having a common vector format, and wherein the training further comprises training the input layers based on the minimizing of the first loss function and the second loss function.

11. A system comprising:

a processor;

a memory communicatively coupled to the processor and bearing instructions that, upon execution by the processor, cause the system to at least:

access a first training dataset comprising first image data, the first training dataset associated with a first image-related task and a first label applicable to the first image data;

access a second training dataset comprising second image data, the second training dataset associated with a second image-related task and a second label applicable to the second image data;

train a convolutional neural network by at least:

minimizing a first loss function for the first training dataset based on the first image-related task and a second loss function for the second training dataset based on the second image-related task, and updating parameters of the convolutional neural network based on the minimizing of the first loss function and the second loss function;

input image data of an image to the convolutional neural network; and generate a feature vector for the image based on the parameters of the convolutional neural network, the feature vector enabling an application of an image-related operation to the image.

12. The system of claim 11, wherein the first label is different from the second label.

13. The system of claim 11, wherein the first image-related task is different from the second image-related task.

14. The system of claim 11, wherein the first label is different from the second label, and wherein the first image-related task and the second image-related task are of the same task type and each is specific to the first label or the second label.

15. The system of claim 11, wherein the first training dataset is associated with a plurality of image-related tasks that comprise the first image-related task, wherein the first loss function comprises a loss function corresponding to each image-related task of the plurality of image-related tasks, and wherein minimizing the first loss function comprises minimizing a sum of a plurality of loss functions corresponding to the plurality of image-related tasks.

16. The system of claim 11, wherein the convolutional neural network is trained based on multiple training data sets and multiple image-related tasks, wherein the instructions further cause the system to at least: map each training dataset to different nodes of an input layer of the convolutional neural network and each image-related task mapped to different nodes of an output layer of the convolutional neural network, and wherein each image-related task corresponds to a training dataset and is associated with a loss function specific to a label of the training dataset.

17. A computer-readable storage medium storing instructions that, when executed on a computing device, configure the computing device to perform operations comprising:

accessing a first training dataset comprising first image data, the first training dataset associated with a first image-related task and a first label applicable to the first image data;

accessing a second training dataset comprising second image data, the second training dataset associated with a second image-related task and a second label applicable to the second image data;

training a convolutional neural network by at least:
  minimizing a first loss function for the first training dataset based on the first-image related task and a second loss function for the second training dataset based on the second-image related task, and
  updating parameters of the convolutional neural network based on the minimizing of the first loss function and the second loss function;

inputting image data of an image to the convolutional neural network; and generating a feature vector for the image based on the parameters of the convolutional neural network, the feature vector enabling an application of an image-related operation to the image.

18. The computer-readable storage medium of claim 17, wherein the operations further comprise:
  populating a feature space based on features generated by the convolutional neural network from the first training dataset and the second training dataset; and
  selecting the image-related operation based on the nearest neighbor of the feature vector to feature vectors from the feature space.

19. The computer-readable storage medium of claim 17, wherein the operations further comprise: selecting the image-related operation from potential image-related operations based on a layer of the convolutional neural network, wherein the layer comprises nodes corresponding to the potential image-related operations and is configured for computing likelihoods corresponding to the potential image-related operations based on the feature vector.

20. The computer-readable storage medium of claim 17, wherein the convolutional neural network is trained based on multiple training data sets, and wherein the training optimizes a sum of multiple loss functions corresponding to the multiple training data sets based on stochastic gradient descends.

* * * * *